US008327770B2

(12) United States Patent
Boren et al.

(10) Patent No.: US 8,327,770 B2
(45) Date of Patent: Dec. 11, 2012

(54) TROLLEY BRAKING SYSTEM (76) Inventors: Daniel Blair Boren, Pukalani, HI (US);
Brett J. Epstein, Jupiter, FL (US); Jason B. Hickman, Jupiter, FL (US); David J. W. Lovinger, Jupiter, FL (US); Gary P. Prus, Jupiter, FL (US); James R. Wilson, Jr., Cambridge, MA (US)

( * ) Notice: Subject to any disclaimer, the term of this patent is extended or adjusted under 35 U.S.C. 154(b) by 0 days.

(21) Appl. No.: 13/291,124

(22) Filed: Nov. 8, 2011

(65) Prior Publication Data
US 2012/0137924 A1 Jun. 7, 2012

Related U.S. Application Data (63) Continuation-in-part of application No. 12/411,253, filed on Mar. 25, 2008, now Pat. No. 8,234,980.

(51) Int. Cl.
*B61B 7/00* (2006.01)
(52) U.S. Cl. ............................ 104/112; 104/113; 104/53
(58) Field of Classification Search .................. 104/112, 104/113, 115, 53; 105/148, 150, 26.1; 472/122, 472/123, 45
See application file for complete search history.

(56) References Cited

U.S. PATENT DOCUMENTS

| | | | | |
|---|---|---|---|---|
| 547,528 A * | 10/1895 | Weaver et al. | ............... | 105/91 |
| 575,528 A * | 1/1897 | Smallwood | .................. | 104/87 |
| 1,087,063 A * | 2/1914 | Izett | ........................ | 104/115 |
| 1,206,581 A * | 11/1916 | Opsal | ........................ | 104/115 |
| 3,070,035 A * | 12/1962 | Russo et al. | .................. | 104/113 |
| 3,192,872 A * | 7/1965 | Parent | ............................ | 104/93 |
| 4,934,277 A * | 6/1990 | Smith et al. | .................... | 104/113 |
| 4,948,118 A * | 8/1990 | Miraglia | ......................... | 482/55 |
| 4,961,385 A * | 10/1990 | Abouzakhm | ................. | 104/113 |
| 5,113,768 A * | 5/1992 | Brown | ........................ | 104/112 |
| 5,224,425 A * | 7/1993 | Remington | ..................... | 104/53 |
| 5,224,426 A * | 7/1993 | Rodnunsky et al. | ........... | 104/112 |
| 5,378,214 A * | 1/1995 | Kreitenberg | .................... | 482/57 |
| 5,904,638 A * | 5/1999 | Habing et al. | ................... | 482/57 |
| 5,931,100 A * | 8/1999 | Sutton et al. | ..................... | 104/53 |
| 6,363,858 B1 * | 4/2002 | Voirin | ........................ | 104/173.1 |
| 6,666,773 B1 * | 12/2003 | Richardson | ..................... | 472/49 |
| 7,381,137 B2 * | 6/2008 | Steele et al. | ..................... | 472/45 |
| 7,404,360 B2 * | 7/2008 | Cylvick | ........................ | 104/112 |
| 7,549,377 B2 * | 6/2009 | Pabst | ........................... | 104/180 |
| 7,637,213 B2 * | 12/2009 | Cylvick | ........................ | 104/112 |
| 2002/0162477 A1 * | 11/2002 | Palumbo | .......................... | 104/87 |

(Continued)

OTHER PUBLICATIONS

International Search Report and Written Opinion (ISR/WO) for corresponding PCT application PCT/US2009/064322.

*Primary Examiner* — Jason C Smith
(74) *Attorney, Agent, or Firm* — Bryan Cave LLP (57) ABSTRACT

A trolley for transporting the rider supported by a harness on a cable or rope, the trolley having a mounting plate configured with a connection point to receive the rider's harness, a pulley rotatably mounted to the mounting plate to support the plate on the cable or rope, and a friction shoe mounted on the plate forward of the pulley to contact the upper portion of the cable or rope, wherein the connection point is located beneath the cable or rope between the centers of the pulley and the friction shoe. The apparatus may also provide a manually operated brake handle to allow the rider to selectively apply braking force to reduce the speed of the trolley on the cable as desired.

11 Claims, 11 Drawing Sheets

U.S. PATENT DOCUMENTS

| | | | |
|---|---|---|---|
| 2003/0066453 A1* | 4/2003 | Cylvick | 104/53 |
| 2004/0198502 A1* | 10/2004 | Richardson | 472/49 |
| 2006/0027134 A1* | 2/2006 | Steele et al. | 104/113 |
| 2006/0288901 A1 | 12/2006 | Cylvick | |
| 2007/0169660 A1* | 7/2007 | Pabst | 104/196 |
| 2008/0121132 A1* | 5/2008 | Cylvick | 104/173.1 |
| 2008/0202375 A1* | 8/2008 | Quattlebaum | 104/112 |
| 2009/0049946 A1* | 2/2009 | Buckman | 74/502.2 |
| 2009/0223406 A1* | 9/2009 | Smith | 104/112 |
| 2009/0255436 A1* | 10/2009 | Buckman | 104/117.1 |
| 2009/0266267 A1* | 10/2009 | Moss | 104/53 |
| 2010/0243374 A1* | 9/2010 | Boren et al. | 182/15 |

* cited by examiner

TROLLEY BRAKING SYSTEM

CROSS-REFERENCE TO RELATED APPLICATION

This application is a continuation-in-part of U.S. application Ser. No. 12/411,253, filed Mar. 25, 2009.

BACKGROUND

1. The Field of the Invention

The present invention is directed to a method and device for transporting at least one person along a suspended cable, and more particularly to a system and method for providing braking on trolleys traveling on suspended cable systems.

2. The Background Art

Many prior art braking devices used on trolleys configured to roll along suspended cables result in a speed that vanes significantly with the slope of the cable. Accordingly, a trolley brake that provides braking force commensurate with the slope of the cable would be desirable as it would allow uninhibited downhill travel, yet would provide the necessary speed reduction when the slope of the cable increases uphill as the rider approaches the landing point.

BRIEF SUMMARY OF THE INVENTION

In view of the foregoing, in accordance with the invention as embodied and broadly described herein, a method and apparatus are disclosed for a trolley which provides braking force commensurate with the slope of the cable. The trolley also provides a manually operated brake handle to allow the rider to selectively apply braking force to reduce the speed of the trolley on the cable as desired.

Figure 3:
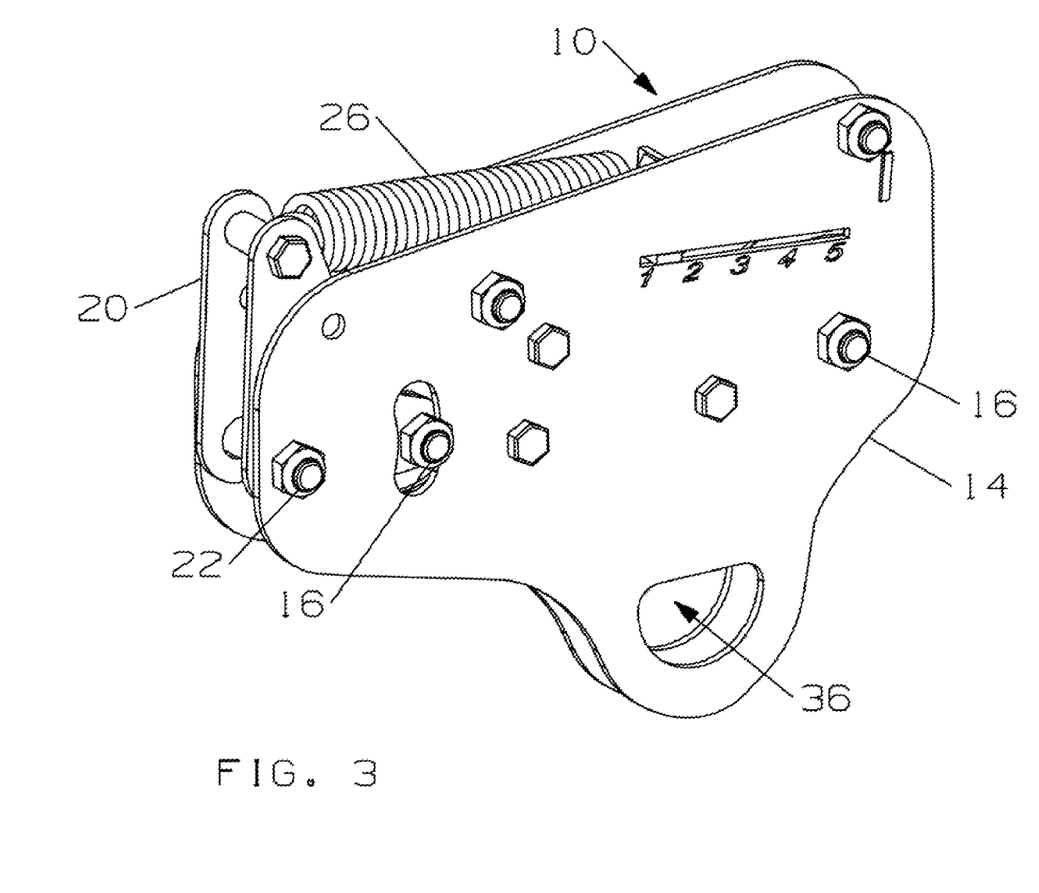
FIG. 3 is a front perspective view of one embodiment of a trolley in accordance with the present invention.

In selected embodiments, a trolley in accordance with the present invention may provide a user with braking force commensurate with the slope of the cable as the trolley travels along a cable. In one embodiment, a pair of pulleys are rotatably mounted on the trolley to rest on the upper portion of the cable or rope. At least one of the pulleys may also be pivotally mounted to the trolley on a pivoting bracket, such that upward force on the pulley is resisted by a bias force on the pulley. The bias force may be provided by a tension spring. The bias force on the pulley may be adjusted by a device which positions the stationary end of the tension spring, such as a threaded shaft as shown in FIG. 3. A friction shoe 34 may be mounted on the trolley between the pulleys to contact the upper portion of the cable between the pulleys to provide braking force. Thus, when the rider is suspended from the plate of the trolley, the weight of the rider forces the biased pulley upward relative to the plate, allowing the shoe to be forced against the cable. This friction of the shoe against the cable provides the braking force.

Various material properties and characteristics may be considered when selecting a material for a friction shoe 34 in accordance with the present invention. Often a material that has certain advantageous characteristics may have others that are disadvantageous. For example, one material may have excellent wear resistance, but its coefficient of friction against a cable may vary greatly depending on whether the cable is dry. Accordingly, the material may be suitable for dry conditions, yet be hazardous for wet conditions. The friction shoe 34 may be formed of substantially inelastic material (e.g., high density polyethylene (HDPE), ultra high molecular weight (UHMW) polyethylene, or the like), or elastic material (e.g., multi-rubber or elastomeric materials such as are used for the caliper brake pads of a bicycle). In certain embodiments, a friction shoe 34 may be formed as a monolithic and homogeneous unit. For example, a friction shoe 34 may be formed as a single, seamless piece of a non-elastic material (e.g., UHMWPE). Alternatively, a friction shoe 34 may include various other segments or inserts selectively providing additional control over braking characteristics.

As can be appreciated by one of ordinary skill in the art, as the slope of the cable transitions from downward to upward, the greater the displacement of rider's weight away from the fixed pulley and toward the friction shoe, thus, increasing the braking force generated against the cable.

Accordingly, by adjusting the tension of the spring which forces the floating pulley against the cable, a user may control, within a particular range, the amount of braking force generated for a particular rider's weight and cable slope.

If a higher speed is desired, the spring tension bias force on the pulley may be increased. In this case, the bias spring forces the floating pulley against the cable, thus reducing the force of the friction shoe against the upper surface of the cable, resulting in lesser braking force.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

While a suspended cable may provide the basis for an amusement ride, other uses are also contemplated, including ski lifts, gondolas, aerial trams, suspended cable evacuation systems, such as oil derrick evacuation systems.

Figure 1:
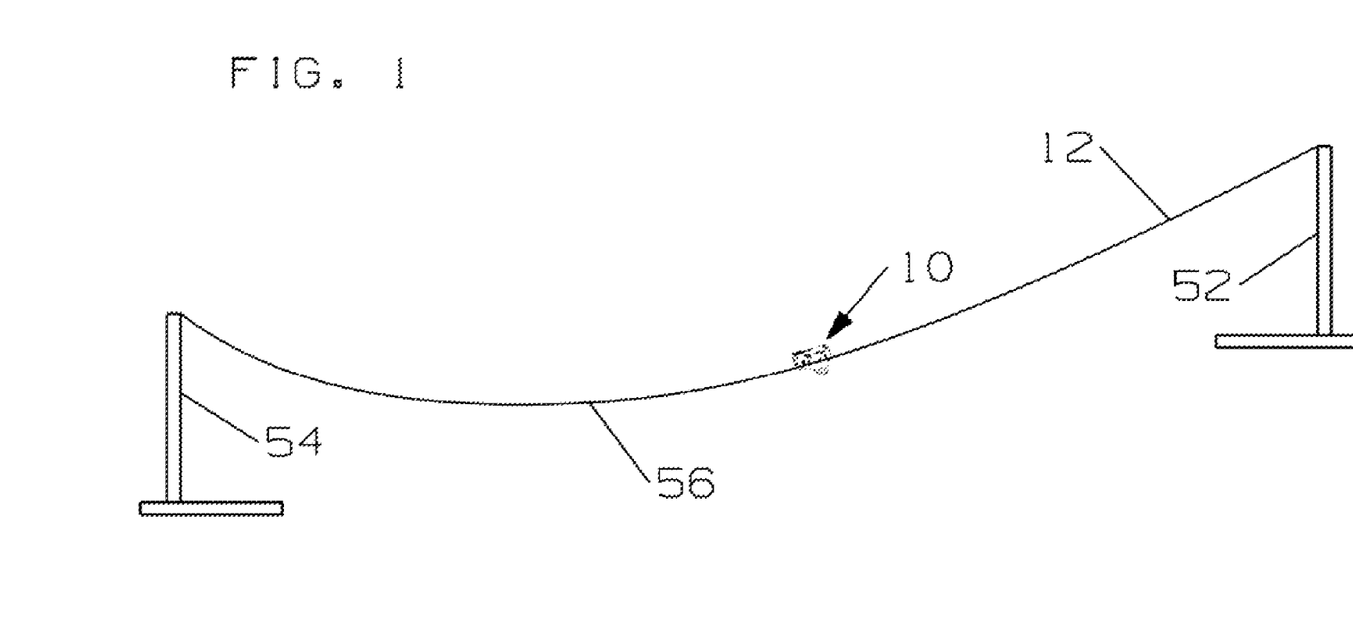
FIG. 1 is a schematic view of one embodiment of a trolley in accordance with the present invention in use on a suspended cable.

Referring to FIG. 1, a trolley 10 in accordance with the present invention may be configured for travel along a cable 12 held in suspension by two or more supports, e.g., trees, towers, platforms. A first support 52 may hold one end of the cable 12 at a higher elevation than a second support 54 holds the other end of the cable 12. Accordingly, a trolley 10 secured to roll along the cable may travel from the first, upper support toward the second, lower support. As the trolley travels downhill, braking is not necessary. However, as the rider approaches the landing point, such as at the point where the cable slope increases from a downhill orientation to the point that it becomes approximately horizontal or uphill 56, braking becomes necessary to reduce the rider's speed for safe arrival at the landing point.

In selected embodiments, a plate 14 may provide the main structure of the trolley 10 or a base to which other components may be secured. The plate 14 may be formed of any suitable material or combination of materials. Characteristics that may be considered when selecting the material for the plate 14 may include cost, formability, machineability, strength, rigidity, durability, corrosion resistance, weight, density, etc. In certain embodiments, aluminum has been found to be a suitable material for a plate 14.

Figure 2:
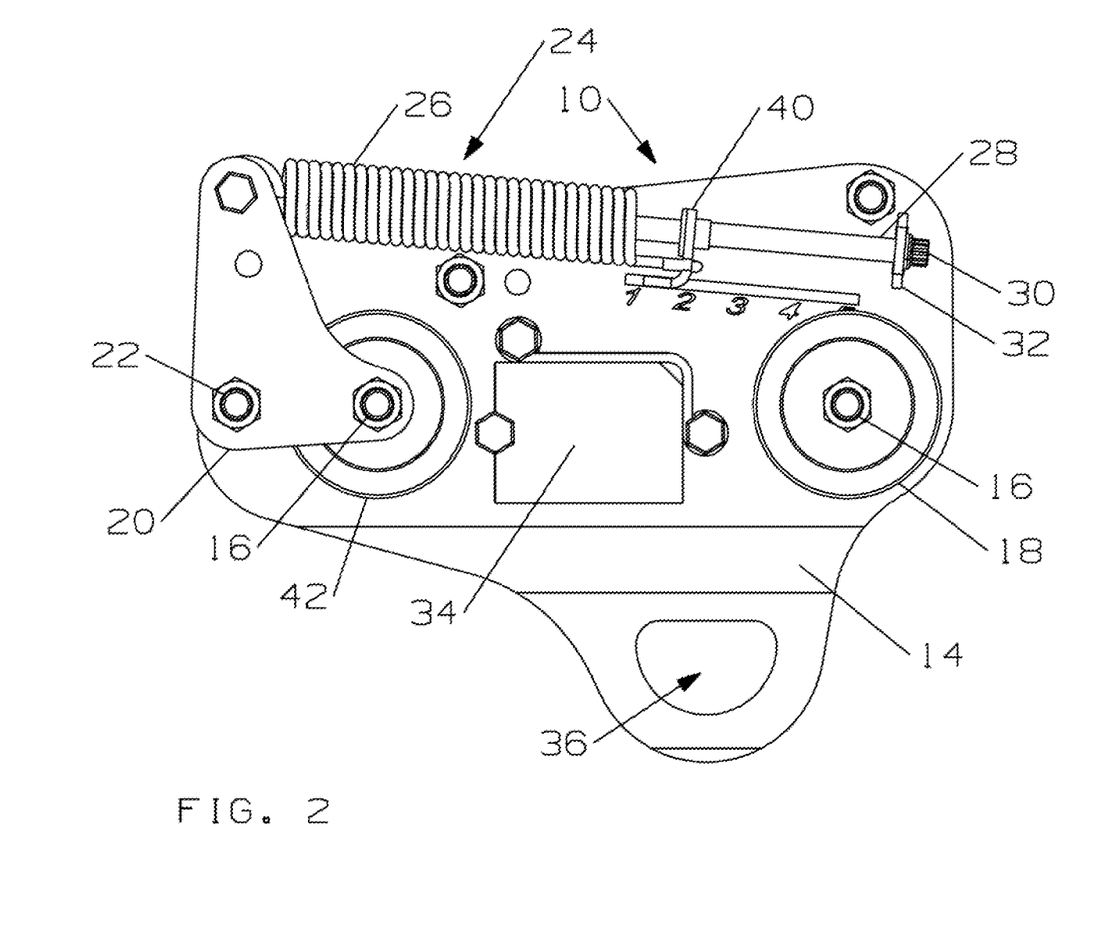
FIG. 2 is a front cross-sectional view of one embodiment of a trolley in accordance with the present invention.

As shown in FIGS. 2 and 3, the plate 14 may include a sheave mount 16 which may support one or more sheaves or pulleys, such as a fixed pulley 18 and a floating pulley 42 positioned to roll along the cable 12. As shown in FIGS. 2 and 3, the trolley 10 may comprise more than one plate 14 to provide for mounting of other trolley components, such as fixed pulley 18 and floating pulley 42, friction shoes 34, and adjustment mechanisms.

As shown in FIGS. 2 and 3, in one embodiment, a floating pulley 42 may be pivotally mounted on the plate 14 by use of a pivoting bracket 20 pivotally mounted to the plate 14 by a bracket mount 22. At the opposite end of pivoting bracket, the adjustment mechanism 24 is attached to allow the user to control the bias applied to resist displacement of the bracket 20 and floating pulley 42 under the applied load of the rider. The adjustment mechanism 24 comprises a tension spring 26 mounted on a threaded shaft 28. The capped end 30 of shaft 28 is rotatably mounted by insertion into an opening in the shaft mount 32 which is larger than the diameter of the threaded portion of the shaft, and smaller than the diameter of the capped portion of the shaft. The capped end 30 of the shaft 28 incorporates a hexagonal, slotted or other standard shaped fitting to mate with a tool to facilitate rotation of the shaft 28 in the mount 32 by the tool, preferably rotated by a user's hand. The capped end 30 may alternatively be configured with a handwheel, such as a knob, to facilitate rotation of the shaft 28 in the shaft mount 32 by the user's hand. The threaded end of the shaft 28 is configured to fit into the inside of the hollow opening in tension spring 26 and to mate with a complementary threaded female opening in the sliding spring mount bracket 40, thus allowing the user to control the tension of the spring 26 which in turn adjusts the force applied by the floating pulley 42 against the cable 12. The trolley also includes a friction shoe 34 for contacting the cable 12, and an opening 36 or other receiving mechanism for securing the rider's harness to the trolley 10.

Figure 4:
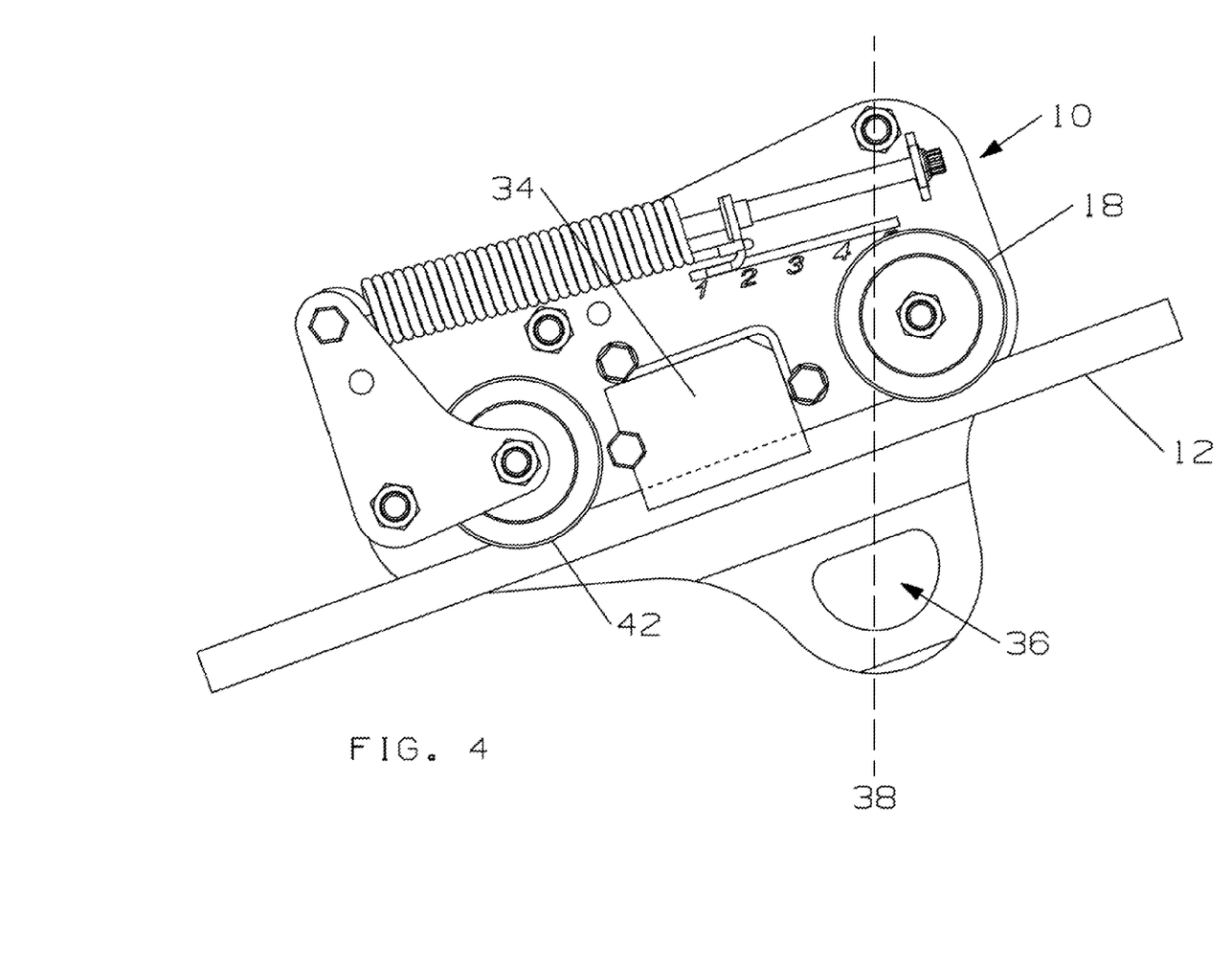
FIG. 4 is a front cross-sectional view of one embodiment of a trolley and cable in the downward travel position in accordance with the present invention.
Figure 5:
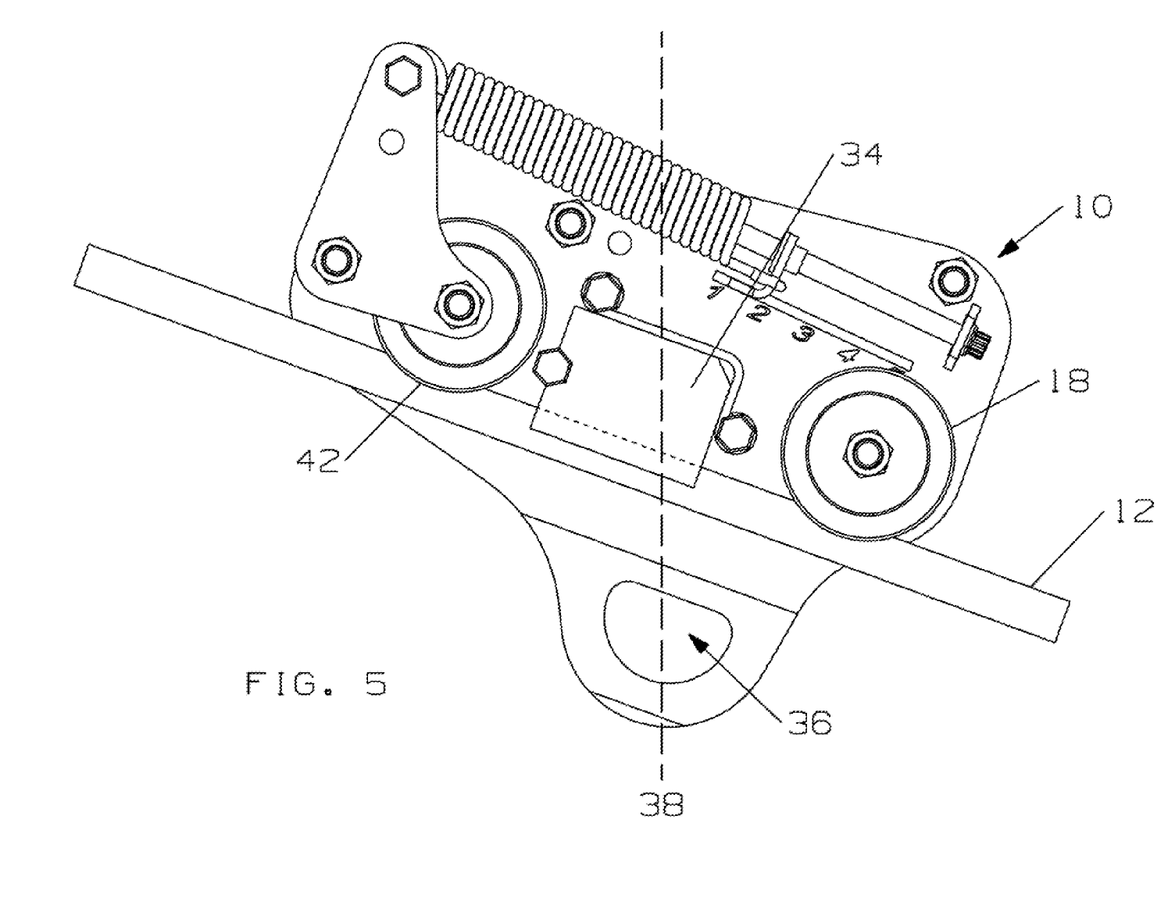
FIG. 5 is a front cross-sectional view of one embodiment of a trolley and cable in the upward travel position in accordance with the present invention.

As shown in FIGS. 4 and 5, because the connection point in the opening 36 for securing the rider's harness to the trolley 10 is offset below the line of the cable running between the fixed pulley 18 and the floating pulley 42, and is located between the centers of the fixed pulley 18 and the friction shoe 34, the vector of the rider's weight 38 on the loaded trolley 10 shifts from a line passing near or through the fixed pulley 18 at the rear of the trolley during downward travel (when the fixed pulley 18 is at a higher elevation than the floating pulley 42) to a line passing near or through the friction shoe 34 located near the center of the trolley during upward travel (when the fixed pulley 18 is at a lower elevation than the floating pulley 42). Thus, as shown in FIG. 4, during downward travel the rider's weight is primarily supported by the fixed rear pulley 18, and the remaining load shared between the floating pulley 42 and the friction shoe 34. By contrast, as shown in FIG. 5, during upward travel, the rider's weight shifts from the fixed pulley 18 to the friction shoe 34.

As shown in FIGS. 4 and 5, because the braking force generated by a trolley 10 is equal to the coefficient of friction between the friction shoe 34 and the cable 12 multiplied by the normal force urging the friction shoe 34 against the cable 12, the braking force applied to the cable 12 will be greater during upward travel than downward travel. As can be appreciated by persons of skill in the art, the magnitude of the effect of a change in the angle of inclination of the trolley upon the applied braking force can be controlled by varying one or more of: the location of the harness connection point opening 36 between the centers of the fixed pulley 18 and the friction shoe 34; the distance the contact point in the opening 36 for securing the rider's harness to the trolley 10 is offset below the line of the cable running between the floating pulley 42 and the fixed pulley 18, the tension rate of the spring 26, the relative position of the friction shoe 34 between the floating pulley 42 and the fixed pulley 18, and the length of the moment arm of the compression spring 26 on the pivoting bracket 20 from the pivot point at the bracket mount 22 relative to the moment arm of the sheave mount 16 on the pivoting bracket 20 from the pivot point at the bracket mount 22. Also, as can be appreciated by persons of skill in the art, the location of the floating pulley 42 may be altered in relation to the fixed pulley 18 and/or the friction shoe 34 without substantially affecting the function of the present invention.

As can be appreciated by persons of skill in the art, the location of the connection point between the centers of the fixed pulley 18 and the friction shoe 34 may be adjusted by slidably mounting the connection point in the opening 36 (for securing the rider's harness to the trolley 10) to the plate 14 of the trolley 10 with an appropriate adjustment and/or locking mechanism, such as a threaded shaft or a slotted connection with a bolt which may be tightened, so that the horizontal orientation of the connection point in the opening 36 in relation to the plate 14 may be adjusted. Similarly, the connection point may be slidably mounted to the plate in a vertical orientation with an appropriate adjustment and/or locking mechanism, such as a threaded shaft or a slotted connection with a bolt which may be tightened, so that the vertical orientation of the connection point in relation to the cable may be adjusted.

Figure 6:
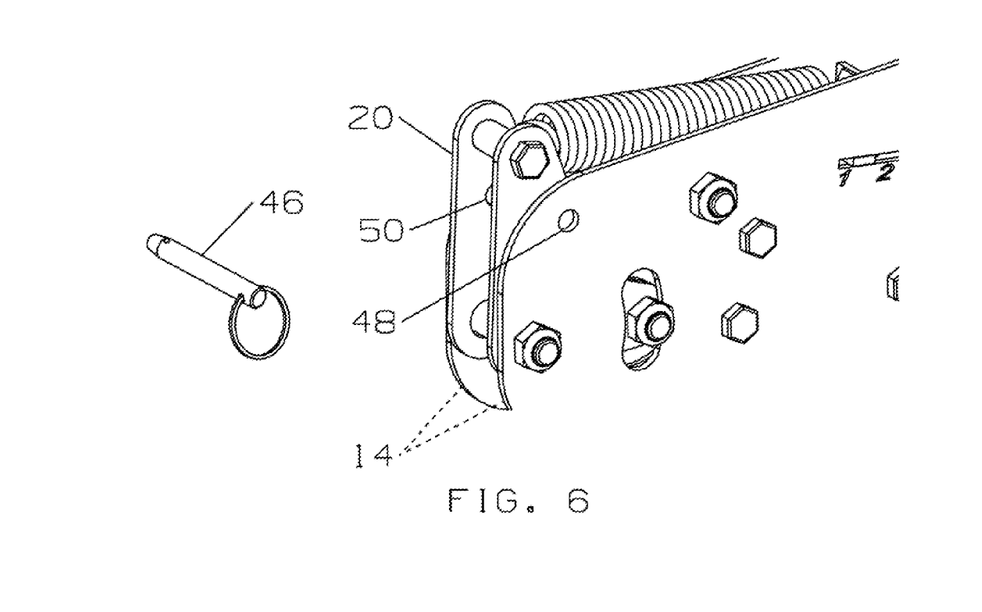
FIG. 6 is a partial front perspective view of one embodiment of a trolley and brake lock-out pin in accordance with the present invention.
Figure 7:
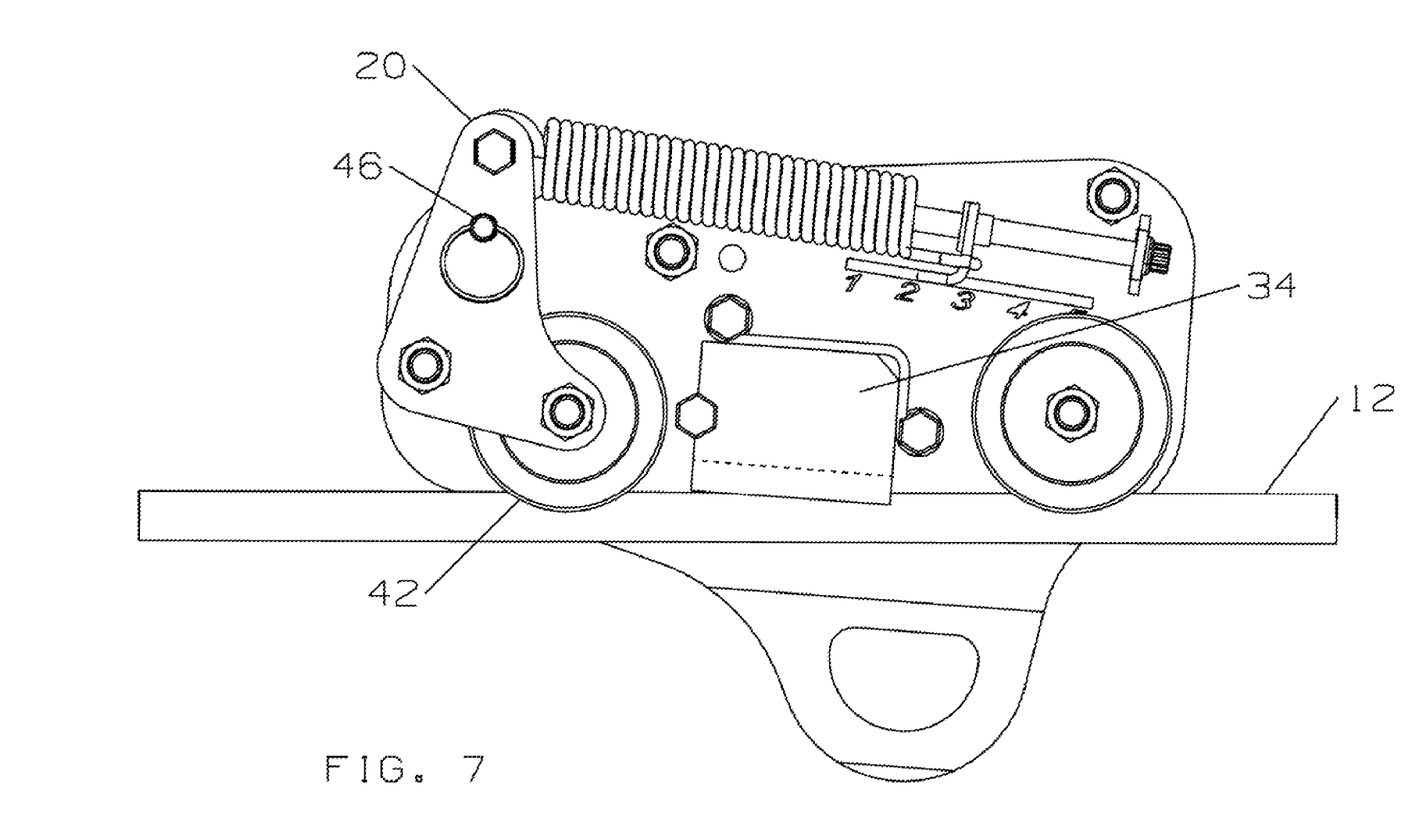
FIG. 7 is a front cross-sectional view of one embodiment of a trolley with the brake lock-out pin in the locked position in accordance with the present invention.

As shown in FIGS. 6 and 7, the present invention may also comprise a trolley a brake lock-out pin 46 which may be inserted by a user to immobilize the pivoting bracket 20 so that the floating pulley 42 becomes fixed in such a position that the friction shoe 34 does not contact the cable 12, thus allowing the trolley 10 to roll freely along the cable 12. As shown in FIGS. 6 and 7, the brake lock-out pin 46 may be inserted through a plate lockout pin hole 48 in the plate 14, and through a bracket lockout pin hole 50 in the pivoting bracket 20 to maintain the floating pulley 42 in a fixed position. The weight of the rider forces cable 12 against the floating pulley 42, producing a rotational force in the pivoting bracket 20, which is resisted by the brake lock-out pin 46. This shear force from the pivoting bracket 20 against the brake lock-out pin 46 generates substantial friction, which resists sliding of the brake lock-out pin 46 in the plate lockout pin hole 48 and the bracket lockout pin hole 50, and thus retains the brake lock-out pin 46 in the locked position. As can be appreciated by persons of skill in the art, various additional means may be used to secure the brake lock-out pin 46 in the locked position, such as cotter pins, lynch pins, clevis pins, or ball locks.

Figure 8:
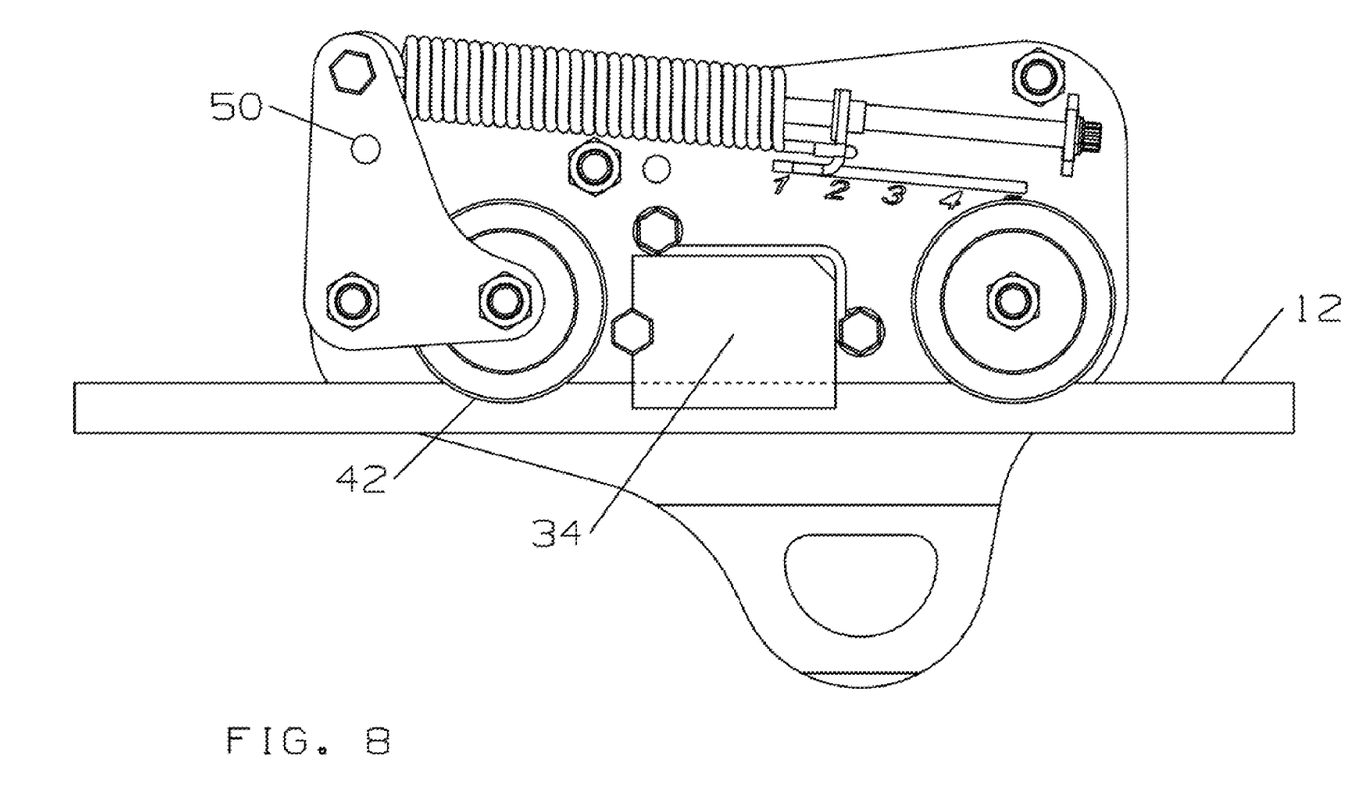
FIG. 8 is a front cross-sectional view of one embodiment of a trolley with the brake lock-out pin in the unlocked position in accordance with the present invention.

FIG. 8 is a front cross-sectional view of a trolley with the brake lock-out pin in the unlocked position such that the floating pulley 42 is free to move into such a position that the friction shoe 34 may contact the cable 12.

Figure 9:
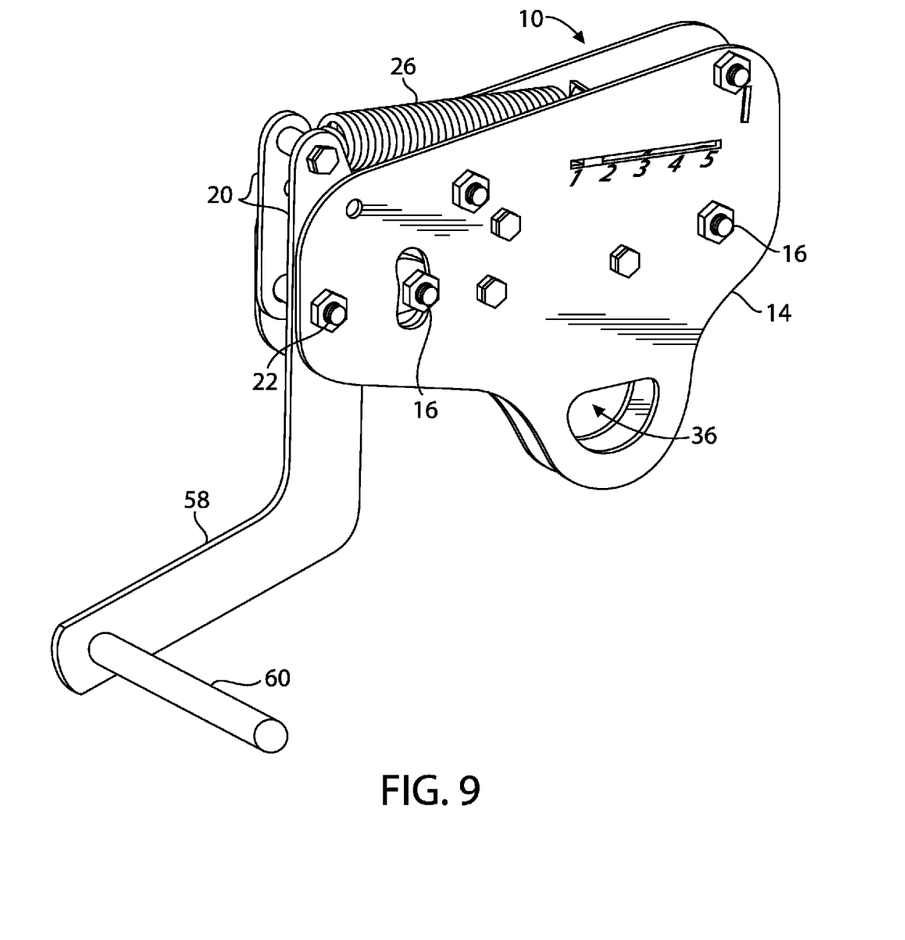
FIG. 9 is a front perspective view of one embodiment of a trolley with a manual braking handle in accordance with the present invention.

As shown in FIG. 9, in another embodiment the pivoting bracket 20 may incorporate a braking arm 58 extending preferably below and forward of the floating pulley 42. The braking arm 58 may be configured with a manual braking handle 60 for access by the rider.

Figure 10:
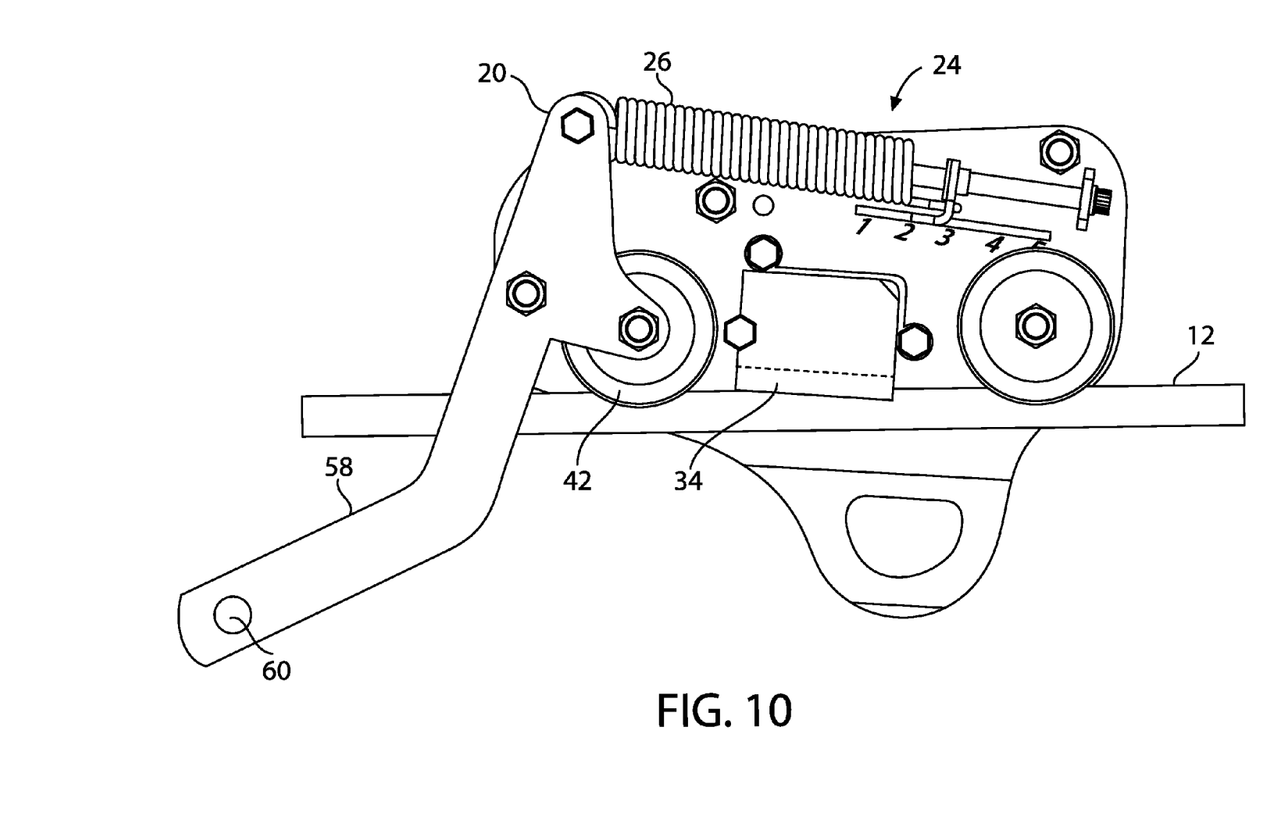
FIG. 10 is a front cross-sectional view of one embodiment of a trolley with a manual braking handle in accordance with the present invention.

As shown in FIG. 10, the floating pulley 42 is pivotally mounted on the plate 14 by pivoting bracket 20 pivotally mounted to the plate 14 by bracket mount 22. At the opposite end of pivoting bracket, the adjustment mechanism 24 allows the user to control the bias applied by tension spring 26 to resist displacement of the bracket 20 and floating pulley 42 under the applied load of the rider. As shown in FIG. 10, when there is no force applied to the handle 60, the bias applied by tension spring 26 of the adjustment mechanism 24 resists the rotational displacement of the bracket 20 and the commensurate upward displacement of the floating pulley 42 under the applied load of the rider.

Figure 11:
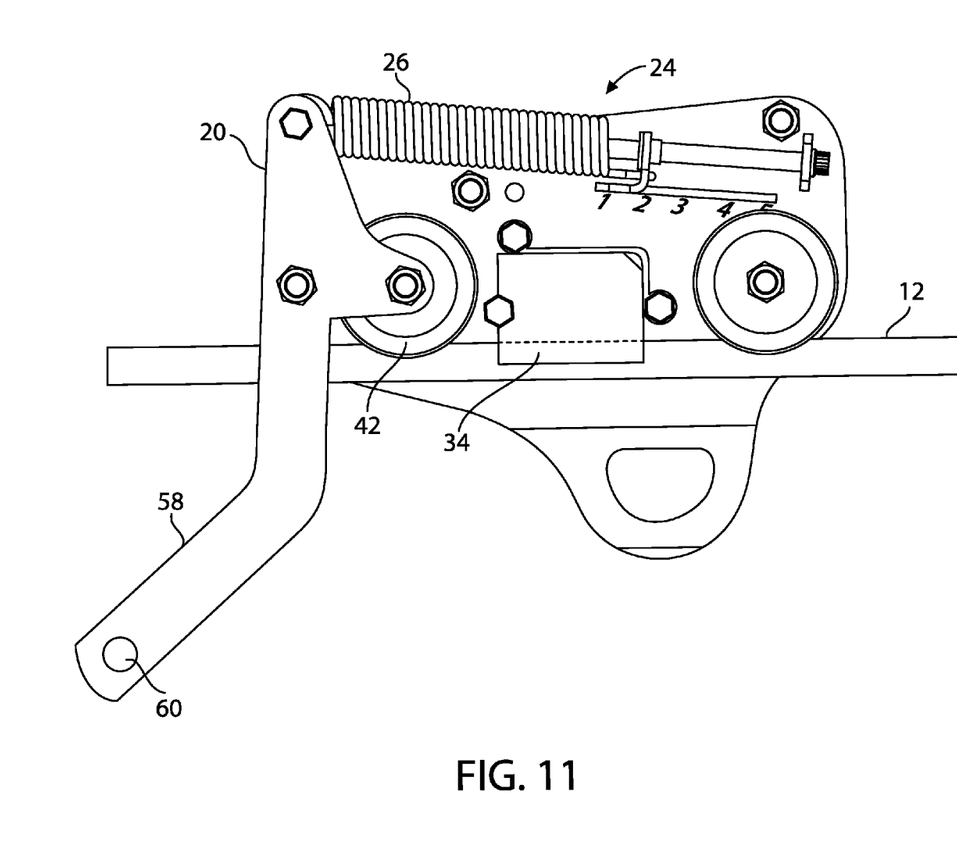
FIG. 11 is a front cross-sectional view of one embodiment of a trolley with a manual braking handle in the manual braking position in accordance with the present invention.

As shown in FIG. 11, by pulling downward on handle 60, the user may apply force to overcome the bias applied by tension spring 26 of the adjustment mechanism 24, which would otherwise resist displacement of the bracket 20 and floating pulley 42 under the applied load of the rider. As shown in FIG. 11, when the rider applies downward force to the handle 60 of braking arm 58, the rotational force on bracket 20 lifts the floating pulley 42 upwards relative to the friction shoe 34, thereby increasing the load on the friction shoe 34, and, consequently, the braking force created by friction shoe 34 against the cable 12. By this method, the rider may apply a braking force to reduce the speed of the trolley 10 along cable 12.

Thus, the present invention provides, in essence, a trolley for suspending and transporting a rider supported by a harness on a cable or rope which comprises a mounting plate configured with a connection point to receive the rider's harness, a pulley rotatably mounted to the mounting plate to support the plate on the cable or rope, a friction shoe mounted on the plate forward of the pulley to contact the upper portion of the cable or rope, in which the connection point is located beneath the cable or rope between the centers of the pulley and the friction shoe.

The present invention also provides a trolley for suspending and transporting a rider supported by a harness on a cable or rope which comprises a mounting plate configured with a connection point to receive the rider's harness, a fixed pulley rotatably mounted to mounting plate, a floating pulley pivotally mounted to the plate in the same plane as the fixed pulley by a mounting arm, the pulleys mounted to support the plate on the cable or rope, a tensioning device mounted to the plate and the mounting arm to bias the floating pulley against the cable or rope, and a friction shoe mounted on the plate between the pulleys to contact the upper portion of the cable or rope, in which the connection point is located beneath the cable or rope between the centers of the pulley and the friction shoe.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A trolley for suspending and transporting a rider supported by a harness on a cable or rope comprising:
   a mounting plate configured with a connection point to receive the rider's harness,
   a fixed pulley rotatably mounted to the mounting plate to support the plate on the cable or rope, and
   a floating pulley pivotally mounted to the plate in the same plane as the fixed pulley by a mounting arm, the mounting arm having a handle, and the pulleys mounted to support the plate on the cable or rope,
   a tensioning device mounted to the plate and the mounting arm to bias the floating pulley against the cable or rope, and
   a friction shoe mounted on the plate between the pulleys to contact the upper portion of the cable or rope.

2. The trolley of claim 1 wherein the second pulley is mounted forward of the fixed pulley.

3. The trolley of claim 2 wherein the tensioning device is a tension spring.

4. The trolley of claim 3 wherein the tension spring is mounted on a threaded shaft having a knob, such that the knob may be rotated to increase the bias against the cable or rope.

5. The trolley of claim 2 wherein the tensioning device is a compression spring.

6. The trolley of claim 5 wherein the compression spring is mounted on a threaded shaft having a knob, such that the knob may be rotated to increase the bias against the cable or rope.

7. The trolley of claim 1 wherein the connection point is slidably mounted to the plate so that the horizontal orientation of the connection point in relation to the plate may be adjusted.

8. The trolley of claim 1 wherein the connection point is slidably mounted to the plate so that the vertical orientation of the connection point in relation to the plate may be adjusted.

9. The trolley of claim 1 wherein the connection point is located between the centers of the fixed pulley and the friction shoe.

10. A trolley for suspending and transporting a rider supported by a harness on a cable or rope comprising:
    a mounting plate configured with a connection point to receive the rider's harness,
    a fixed pulley rotatably mounted to mounting plate,
    a floating pulley pivotally mounted to the plate in the same plane as the fixed pulley by a mounting arm, the mounting arm having a handle, and the pulleys mounted to support the plate on the cable or rope, a tensioning device mounted to the plate and the mounting arm to bias the floating pulley against the cable or rope, and a friction shoe mounted on the plate between the pulleys to contact the upper portion of the cable or rope, wherein the connection point is located between the centers of the fixed pulley and the friction shoe.

11. An apparatus for transporting a rider between two points comprising:

a cable or rope;

a plurality of supports configured to suspend the cable or rope between two points of unequal elevation; and a trolley for suspending and transporting the rider supported by a harness on the cable or rope having:

a mounting plate configured with a connection point to receive the rider's harness, a fixed pulley rotatably mounted to mounting plate, a floating pulley pivotally mounted to the plate in the same plane as the fixed pulley by a mounting arm, the mounting arm having a handle, and the pulleys mounted to support the plate on the cable or rope, a tensioning device mounted to the plate and the mounting arm to bias the floating pulley against the cable or rope, and a friction shoe mounted on the plate between the pulleys to contact the upper portion of the cable or rope, wherein the connection point is located between the centers of the fixed pulley and the friction shoe.

* * * * *